United States Patent
Cook et al.

(10) Patent No.: US 10,704,824 B1
(45) Date of Patent: Jul. 7, 2020

(54) REFRIGERATOR CASING WITH A MITERED FRONT CORNER JOINT

(71) Applicant: Haier US Appliance Solutions, Inc., Wilmington, DE (US)

(72) Inventors: Todd Duncan Cook, Louisville, KY (US); Pat Napier, Crestwood, KY (US); William Jeremy Leachman, Pewee Valley, KY (US); Steven David Paul, Louisville, KY (US); Bagawathkumar Chellappan, Prospect, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 0 days.

(21) Appl. No.: 16/401,213

(22) Filed: May 2, 2019

(51) Int. Cl.
*F25D 23/06* (2006.01)
*F16B 5/00* (2006.01)

(52) U.S. Cl.
CPC .......... *F25D 23/063* (2013.01); *F16B 5/0096* (2013.01); *F25D 2323/06* (2013.01)

(58) Field of Classification Search
CPC .. F25D 23/063; F25D 23/062; F25D 2323/06; F16B 5/0096
See application file for complete search history.

(56) References Cited

U.S. PATENT DOCUMENTS

| | | | |
|---|---|---|---|
| 4,577,915 A * | 3/1986 | Nishida | F25D 23/087 220/62 |
| 5,240,295 A | 8/1993 | Spencer | |
| 7,055,920 B2 * | 6/2006 | Leistner | B60N 3/104 220/592.06 |
| 7,108,341 B2 * | 9/2006 | Myers | F25D 23/066 312/352 |
| 9,695,649 B2 | 7/2017 | Magnuson et al. | |
| 9,700,363 B2 | 7/2017 | Jaramillo et al. | |
| 9,702,322 B2 | 7/2017 | Makino et al. | |
| 9,702,794 B2 | 7/2017 | Pierry | |
| 9,708,114 B2 | 7/2017 | Moon et al. | |
| 9,713,354 B2 | 7/2017 | Bolen | |
| 9,716,334 B1 | 7/2017 | Thompson | |
| 9,725,895 B1 | 8/2017 | Gill | |
| 9,731,409 B2 | 8/2017 | Meinzer et al. | |
| 9,739,074 B1 | 8/2017 | Lane et al. | |
| 9,757,851 B2 | 9/2017 | Meinzer et al. | |
| 9,784,454 B2 | 10/2017 | Kadus et al. | |
| 9,787,161 B2 | 10/2017 | Eftekharzadeh | |
| 9,795,415 B2 | 10/2017 | Bono et al. | |
| 9,797,161 B2 | 10/2017 | Kaukinen | |
| 9,803,844 B2 | 10/2017 | Chad | |
| 9,820,520 B2 | 11/2017 | Bolen | |
| 9,854,793 B2 | 1/2018 | Hawley, Jr. | |
| 9,878,273 B2 | 1/2018 | Ergican et al. | |
| 9,897,818 B2 | 2/2018 | Haymond | |
| 9,903,569 B2 | 2/2018 | O'Brien et al. | |
| 9,974,363 B2 | 5/2018 | Bolen | |
| 2017/0016625 A1 | 1/2017 | Sanfrey et al. | |
| 2017/0059177 A1 | 3/2017 | Yancey | |

\* cited by examiner

*Primary Examiner* — Daniel J Rohrhoff
(74) *Attorney, Agent, or Firm* — Dority & Manning, P.A.

(57) ABSTRACT

A refrigerator appliance includes a cabinet that defines a chilled chamber. The cabinet has an outer casing with a first front flange and a second front flange. The first and second front flanges are connected at a mitered joint. Each of the first and second front flanges has a tab extending into the outer casing. The tabs of the first and second front flanges are plastically deformed together at the mitered joint.

17 Claims, 7 Drawing Sheets

REFRIGERATOR CASING WITH A MITERED FRONT CORNER JOINT

FIELD OF THE INVENTION

The present subject matter relates generally to refrigerator casings with mitered front corner joints.

BACKGROUND OF THE INVENTION

Refrigerator appliances frequently include a metal casing with two or more front flanges. In certain refrigerator appliances, the front flanges are connected together at a mitered joint. Mitered joints can have an attractive appearance relative to other joint types but also pose challenges.

Previously, mitered joints were welded and required post-process painting. Painting is an expensive, time consuming process, especially during assembly of the refrigerator appliances. Pre-painted metal sheets can be used without welding, but rubbing between the front flanges at the mitered joints can damage the pre-painted metal, and repairing paint is an expensive, time consuming process.

BRIEF DESCRIPTION OF THE INVENTION

Aspects and advantages of the invention will be set forth in part in the following description, or may be apparent from the description, or may be learned through practice of the invention.

In a first example embodiment, a refrigerator appliance includes a cabinet that defines a chilled chamber. The cabinet has an outer casing with a first front flange and a second front flange. The first and second front flanges are connected at a mitered joint. A door is mounted to the cabinet. The door seals the chilled chamber when the door is closed. Each of the first and second front flanges has a tab extending into the outer casing. The tabs of the first and second front flanges are plastically deformed together at the mitered joint.

In a second example embodiment, a method for forming a casing of a refrigerator appliance includes positioning a first front flange of an outer casing and a second front flange of the outer casing such that a tab of the first front flange is positioned adjacent a tab of the second front flange. The tabs of the first and second front flanges extend into the outer casing. The method also includes connecting the first front flange to the second front flange at a mitered joint by plastically deforming the tabs of the first and second front flanges together.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Figure 1:
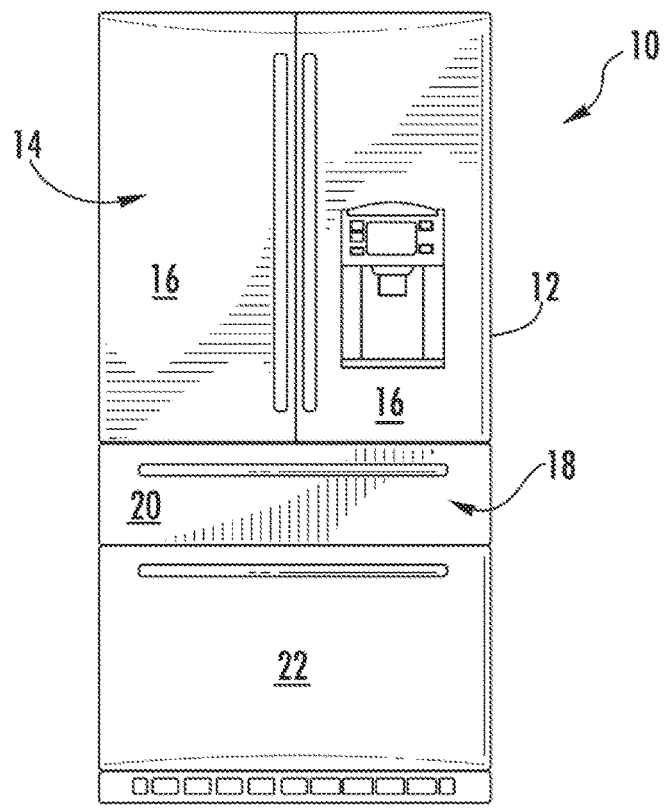
FIG. 1 is a front elevation view of a refrigerator appliance according to an example embodiment of the present subject matter.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 2:
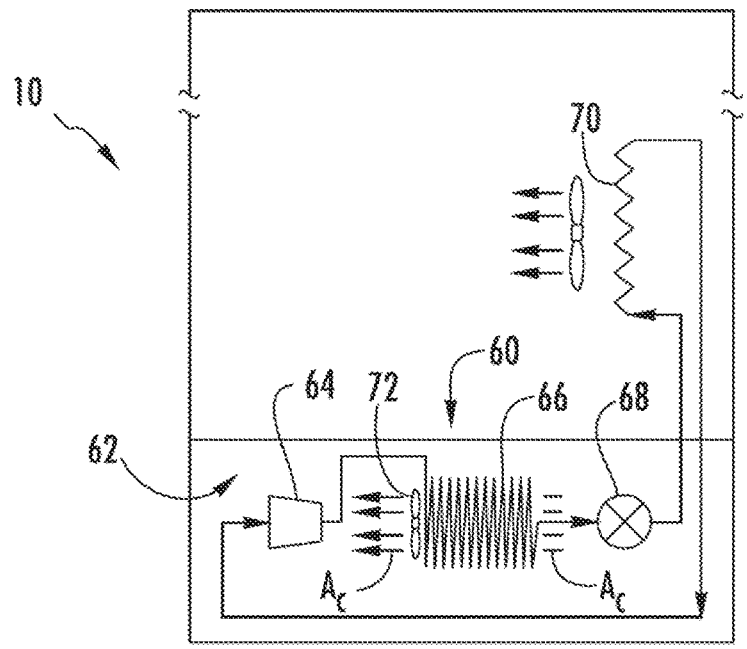
FIG. 2 is schematic view of certain components of the example refrigerator appliance of FIG. 1.

FIG. 1 depicts a refrigerator appliance 10 that incorporates a sealed refrigeration system 60 (FIG. 2). It should be appreciated that the term "refrigerator appliance" is used in a generic sense herein to encompass any manner of refrigeration appliance, such as a freezer, refrigerator/freezer combination, and any style or model of conventional refrigerator. In the illustrated example embodiment shown in FIG. 1, the refrigerator appliance 10 is depicted as an upright refrigerator having a cabinet 12 that defines a number of internal chilled storage compartments. In particular, refrigerator appliance 10 includes upper fresh-food compartments 14 having doors 16 and lower freezer compartment 18 having upper drawer 20 and lower drawer 22. The drawers 20 and 22 are "pull-out" drawers in that they can be manually moved into and out of the freezer compartment 18 on suitable slide mechanisms. In alternative example embodiments, the refrigerator appliance may be a side-by-side style refrigerator appliance, a top mount style refrigerator appliance, etc.

FIG. 2 is a schematic view of certain components of refrigerator appliance 10, including a sealed refrigeration system 60 of refrigerator appliance 10. A machinery compartment 62 contains components for executing a known vapor compression cycle for cooling air. The components include a compressor 64, a condenser 66, an expansion device 68, and an evaporator 70 connected in series and charged with a refrigerant. As will be understood by those skilled in the art, refrigeration system 60 may include additional components, e.g., at least one additional evaporator, compressor, expansion device, and/or condenser. As an example, refrigeration system 60 may include two evaporators.

Within refrigeration system 60, refrigerant flows into compressor 64, which operates to increase the pressure of the refrigerant. This compression of the refrigerant raises its temperature, which is lowered by passing the refrigerant through condenser 66. Within condenser 66, heat exchange with ambient air takes place so as to cool the refrigerant. A fan 72 is used to pull air across condenser 66, as illustrated by arrows $A_C$, so as to provide forced convection for a more rapid and efficient heat exchange between the refrigerant within condenser 66 and the ambient air. Thus, as will be understood by those skilled in the art, increasing air flow across condenser 66 can, e.g., increase the efficiency of condenser 66 by improving cooling of the refrigerant contained therein.

An expansion device (e.g., a valve, capillary tube, or other restriction device) 68 receives refrigerant from condenser 66. From expansion device 68, the refrigerant enters evaporator 70. Upon exiting expansion device 68 and entering evaporator 70, the refrigerant drops in pressure. Due to the pressure drop and/or phase change of the refrigerant, evaporator 70 is cool relative to compartments 14 and 18 of refrigerator appliance 10. As such, cooled air is produced and refrigerates compartments 14 and 18 of refrigerator appliance 10. Thus, evaporator 70 is a type of heat exchanger which transfers heat from air passing over evaporator 70 to refrigerant flowing through evaporator 70.

Collectively, the vapor compression cycle components in a refrigeration circuit, associated fans, and associated compartments are sometimes referred to as a sealed refrigeration system operable to force cold air through compartments 14, 18 (FIG. 1). The refrigeration system 60 depicted in FIG. 2 is provided by way of example only. Thus, it is within the scope of the present subject matter for other configurations of the refrigeration system to be used as well.

Figure 3:
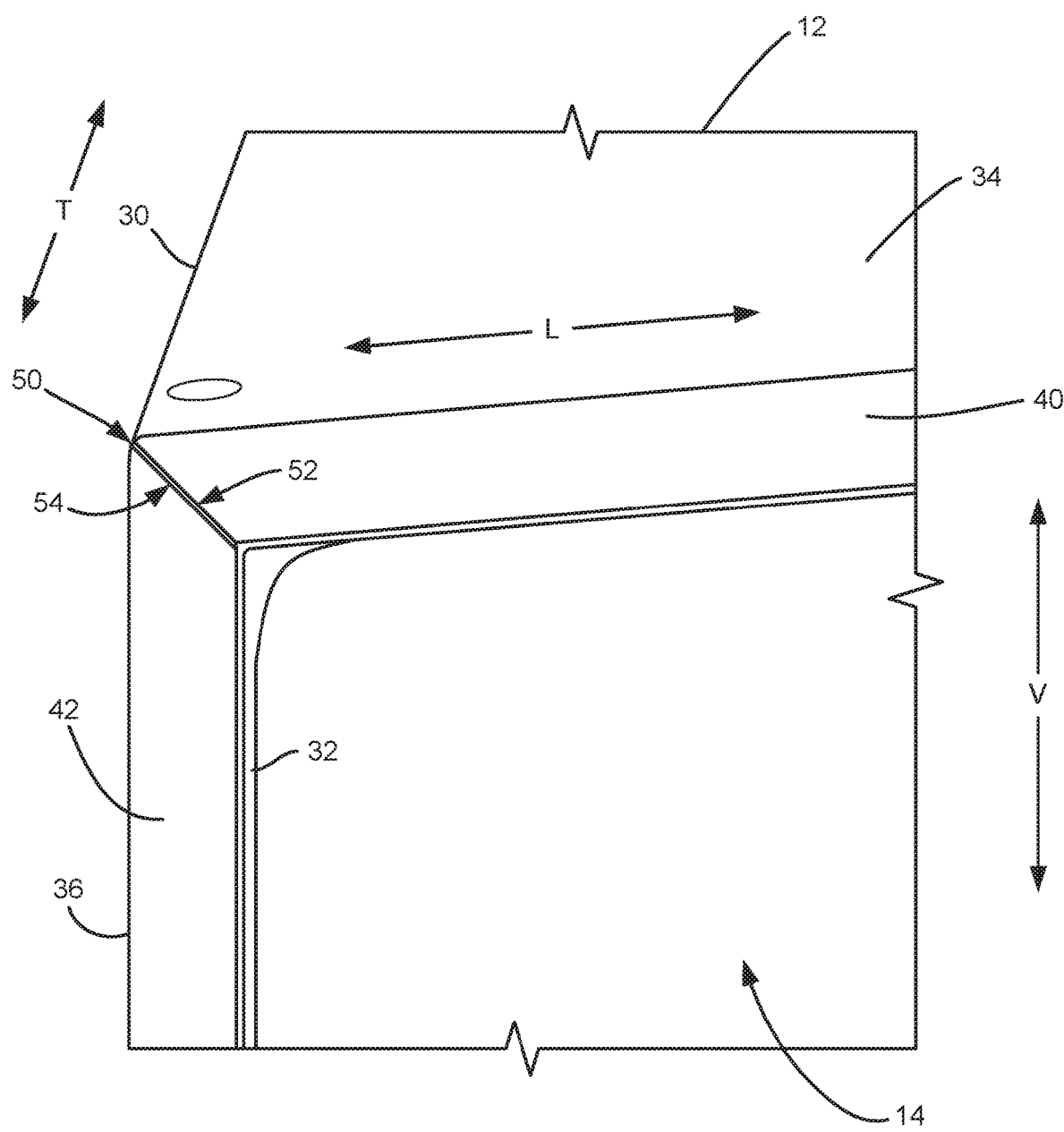
FIG. 3 is a front, partial perspective view of a cabinet of the example refrigerator appliance of FIG. 1.

FIG. 3 is a front, partial perspective view of cabinet 12. Cabinet 12 defines a vertical direction V, a lateral direction L and a transverse direction T. The vertical direction V, the lateral direction L and the transverse direction may be mutually perpendicular and form an orthogonal direction system. As may be seen in FIG. 3, cabinet 12 includes an outer casing 30 and one or more inner liners 32. Internal chilled storage compartments, such as upper fresh-food compartments 14 in FIG. 3, are contained within outer casing 30 and inner liners 32. Inner liners 32 are generally molded from a suitable plastic material, and inner surfaces of inner liners 32 may define the internal chilled storage compartments. Outer casing 30 is generally formed by folding a sheet of a suitable material, such as a pre-painted steel sheet, into an inverted U-shape to form a top panel 34 and a pair of side panels 36 of outer casing 30. Only one side of cabinet 12 is shown in FIG. 3, but it will be understood that the opposite side of cabinet 12 may be constructed in the same or similar manner. A bottom wall (not shown) of outer casing 30 normally is formed separately and attached to side panels 36 and to a bottom frame that provides support for refrigerator appliance 10. Insulation fills the space between outer casing 30 and inner liners 32.

Outer casing 30 also include a first front flange 40 and a second front flange 42. First and second front flanges 40, 42 are positioned at a front of cabinet 12, and, e.g., doors 16 may rest on or against first and second front flanges 40, 42 when doors 16 are closed as shown in FIG. 1. In certain example embodiments, first front flange 40 may extend downwardly along the vertical direction V from top panel 34, and second front flange 36 may extend inwardly from one of side panels 36 along the lateral direction L. Thus, top panel 34 may be bent to form first front flange 40, and first front flange 40 may correspond to a top flange of outer casing 30. Similarly, one of side panels 36 may be bent to form second front flange 42, and second front flange 42 may correspond to a side flange of outer casing 30.

First and second front flanges 40, 42 are connected at a mitered joint 50. For example, an edge 52 of first front flange 40 may face an edge 54 of second front flange 42 at mitered joint 50. The edges 52, 54 may be beveled at forty-five degrees (45°). Thus, mitered joint 50 may form a ninety degree (90°) corner. Outer casing 30 includes features for strengthening mitered joint 50, as discussed in greater detail below.

Figure 4:
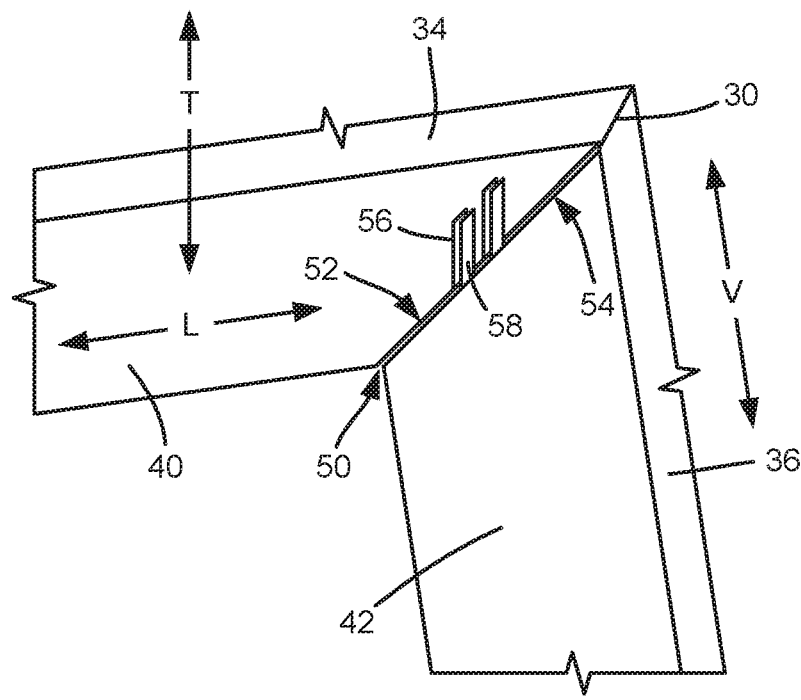
FIGS. 4 and 5 are rear, partial perspective views of a casing of the example refrigerator appliance of FIG. 1 in various stages of assembly.
Figure 5:
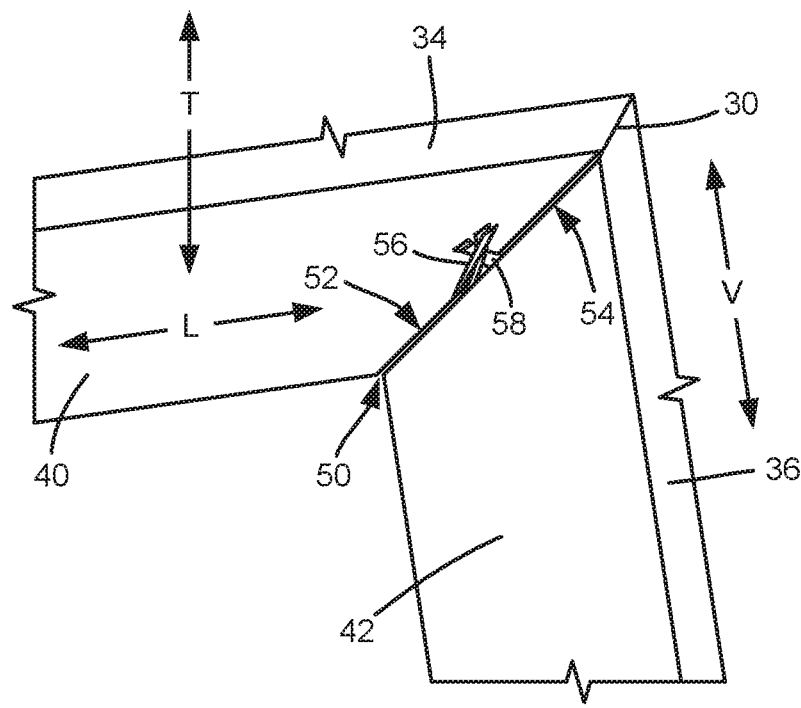

FIGS. 4 and 5 are rear, partial perspective views of outer casing 30 in various stages of assembly. As may be seen in FIGS. 4 and 5, first front flange 40 has a tab 56, and second front flange 42 also has a tab 58. In certain example embodiments, tab 56 of first front flange 40 may extend along the transverse direction T from first front flange 40. Thus, tab 56 of first front flange 40 may be formed from the sheet metal of first front flange 40 and bent to extend along the transverse direction T into outer casing 30. Similarly, tab 58 of second front flange 42 may extend along the transverse direction T from second front flange 42. Thus, tab 58 of second front flange 42 may be formed from the sheet metal of second front flange 42 and bent to extend along the transverse direction T into outer casing 30. As shown in FIGS. 4 and 5, first front flange 40 may have two (or more) tabs 56, and second front flange 42 may have two (or more) tabs 58. Tabs 56, 58 may be square shaped in certain example embodiments.

Tabs 56, 58 are twisted together at mitered joint 50. Tabs 56, 58 are twisted together at mitered joint 50 to any suitable degree. For example, tabs 56, 58 may be twisted one hundred and eighty degrees (180°) from an undeformed configuration, e.g., that is shown in FIG. 4. As another example, tabs 56, 58 may be twisted three hundred and sixty degrees (360°) from the undeformed configuration.

By twisting tabs 56, 58 together, first and second front flanges 40, 42 are coupled to each other at mitered joint 50. Thus, e.g., edge 52 of first front flange 40 may be fixed relative to edge 54 of second front flange 42 at mitered joint 50, and scraping of paint on the edges 52, 54 may be reduced by coupling first and second front flanges 40, 42 together with tabs 56, 58. In such a manner, costly additional painting of outer casing 30 is reduced, and outer casing 30 may not require welding to form mitered joint 50. Tabs 56, 58 may be undercut at proximal ends of tabs 56, 58 to facilitate twisting tabs 56, 58 together.

It will be understood that mitered joint 50 may be visible when door 16 is open. Thus, coupling first and second front flanges 40, 42 to each other at mitered joint 50 with tabs 56, 58 may improve a cosmetic appearance of mitered joint 50 relative to mitered joints with scraped paint formed by known methods. Door 16 may be positioned over mitered joint 50 when door 16 is closed as shown in FIG. 1.

An example method for forming outer casings for refrigerator appliances will now be described. Utilizing such method, mitered joint 50 may be formed without requiring welding and/or costly repainting. It will be understood that while discussed below in a certain sequence, the outer casing formation method may be performed in other suitable sequences in alternative example embodiments. Thus, the outer casing formation method is not limited to the particular sequence described below.

Initially, a single piece of, e.g., pre-painted, sheet metal may be cut and bent/folded to form various components of outer casing 30. For example, the single piece of sheet metal may be cut and bent/folded to form top panel 34 and side panels 36 into an inverted U-shape. Further, first and second front flanges 40, 42 with tabs 56, 58 may also be cut and bent/folded from the single piece of sheet metal. In alternative example embodiments, tabs 56, 58 may be formed separately from first and second front flanges 40, 42.

First front flange 40 and second front flange 42 may then be positioned such that tab 56 of first front flange 40 is positioned adjacent tab 58 of second front flange 42. Tabs 56, 58 may extend into outer casing 30, e.g., along the transverse direction T. First front flange 40 is then connected to second front flange 42 at mitered joint 50 by twisting tabs 56, 58 together. As an example, a die may be positioned over tabs 56, 58 and rotated to twist tabs 56, 58 together.

Utilizing the above described method, tabs 56, 58 may couple first and second front flanges 40, 42 without requiring glue, welding, elevated temperatures etc., and the sheet metal used to form outer casing 430 may be pre-painted. In addition, the twisting of tabs 56, 58 may draw edge 52 of first front flange 40 towards edge 54 of second front flange 42 and thus reduce the gap between first and second front flanges 40, 42 at mitered joint 50.

Figure 6:
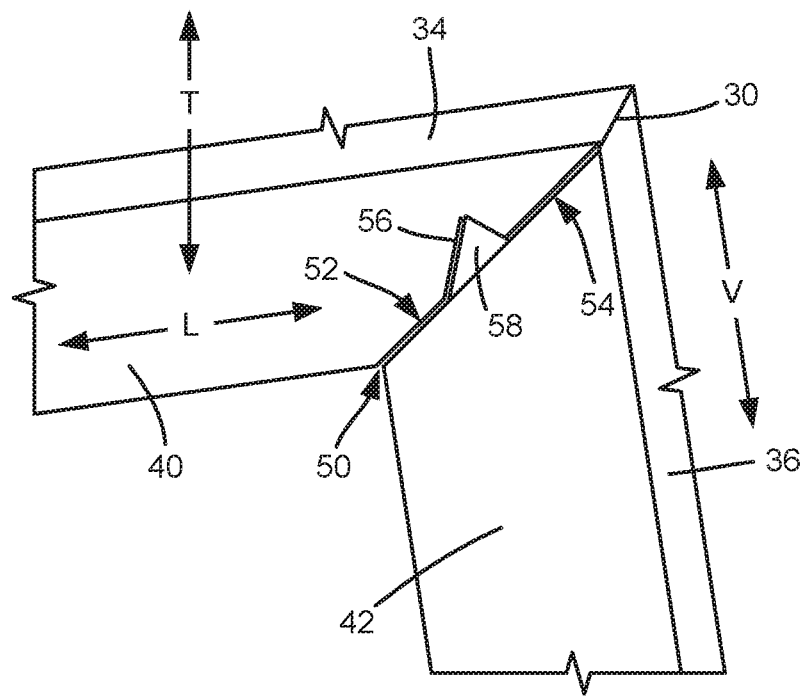
FIGS. 6, 7 and 8 are rear, partial perspective views of a casing according to another example embodiment of the present subject matter in various stages of assembly.
Figure 7:
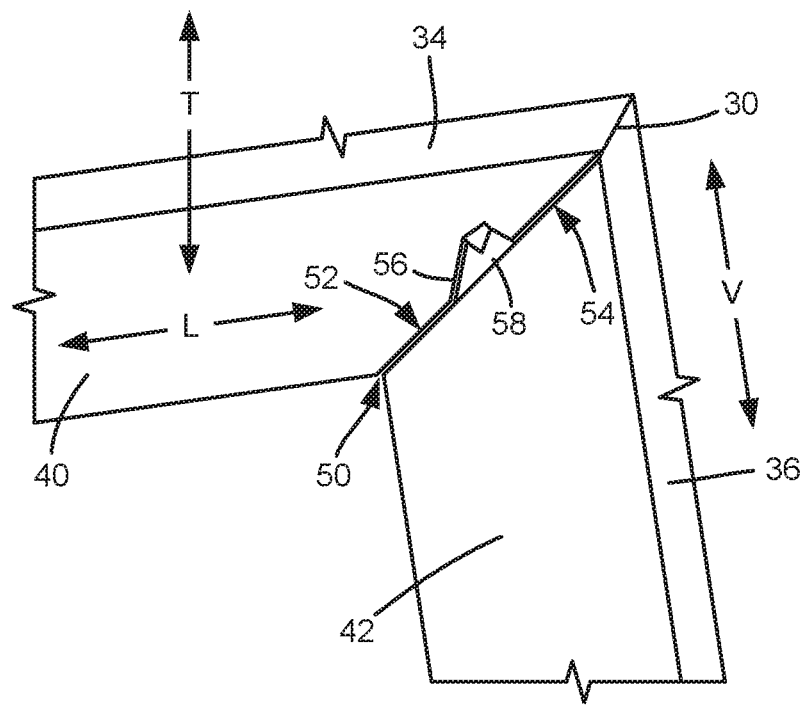
Figure 8:
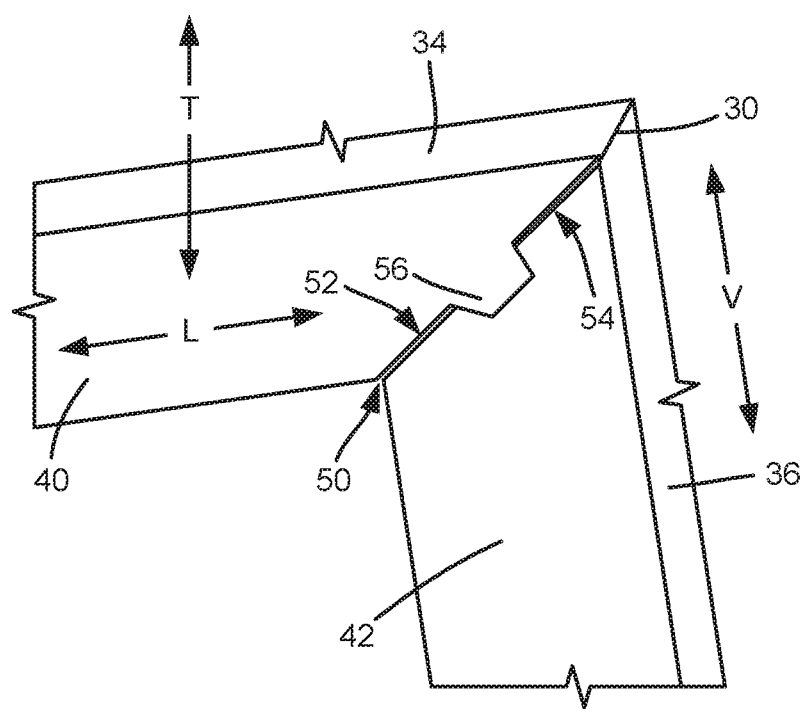

FIGS. 6, 7 and 8 are rear, partial perspective views of outer casing 30 according to another example embodiment of the present subject matter in various stages of assembly. As may be seen in FIGS. 6 through 8, first front flange 40 has tab 56, and second front flange 42 also has tab 58, e.g., as described above. Tabs 56, 58 may be triangularly and/or trapezoidal shaped in certain example embodiments. While shown extend only along a portion of edges 52, 54, tabs 56, 58 may extend along the entire length of edges 52, 54 in alternative example embodiments.

Tabs 56, 58 are folded together at mitered joint 50. For example, a top of tab 56 may be folded over together with the top of tab 58, as shown in FIG. 7. Tab 58 may also be folded over tab 58 until tabs 56, 58 are folded flat onto second front flange 42, as shown in FIG. 8.

By folding tabs 56, 58 together, first and second front flanges 40, 42 are coupled to each other at mitered joint 50. Thus, e.g., edge 52 of first front flange 40 may be fixed relative to edge 54 of second front flange 42 at mitered joint 50, and scraping of paint on the edges 52, 54 may be reduced by coupling first and second front flanges 40, 42 together with tabs 56, 58. In such a manner, costly additional painting of outer casing 30 is reduced, and outer casing 30 may not require welding to form mitered joint 50.

An example method for forming outer casings for refrigerator appliances will now be described. Utilizing such method, mitered joint 50 may be formed without requiring welding and/or costly repainting. It will be understood that while discussed below in a certain sequence, the outer casing formation method may be performed in other suitable sequences in alternative example embodiments. Thus, the outer casing formation method is not limited to the particular sequence described below.

Initially, a single piece of, e.g., pre-painted, sheet metal may be cut and bent/folded to form various components of outer casing 30. For example, the single piece of sheet metal may be cut and bent/folded to form top panel 34 and side panels 36 into an inverted U-shape. Further, first and second front flanges 40, 42 with tabs 56, 58 may also be cut and bent/folded from the single piece of sheet metal. In alternative example embodiments, tabs 56, 58 may be formed separately from first and second front flanges 40, 42.

First front flange 40 and second front flange 42 may then be positioned such that tab 56 of first front flange 40 is positioned adjacent tab 58 of second front flange 42. Tabs 56, 58 may extend into outer casing 30, e.g., along the transverse direction T. First front flange 40 is then connected to second front flange 42 at mitered joint 50 by folding the top portion of tab 56 onto the top portion of tab 58, as shown in FIG. 7. Tabs 56, 58 may then be folded flat onto second front flange 42, as shown in FIG. 8.

Utilizing the above described method, tabs 56, 58 may couple first and second front flanges 40, 42 without requiring glue, welding, elevated temperatures etc., and the sheet metal used to form outer casing 430 may be pre-painted. In addition, the folding of tabs 56, 58 may draw edge 52 of first front flange 40 towards edge 54 of second front flange 42 and thus reduce the gap between first and second front flanges 40, 42 at mitered joint 50.

Figure 9:
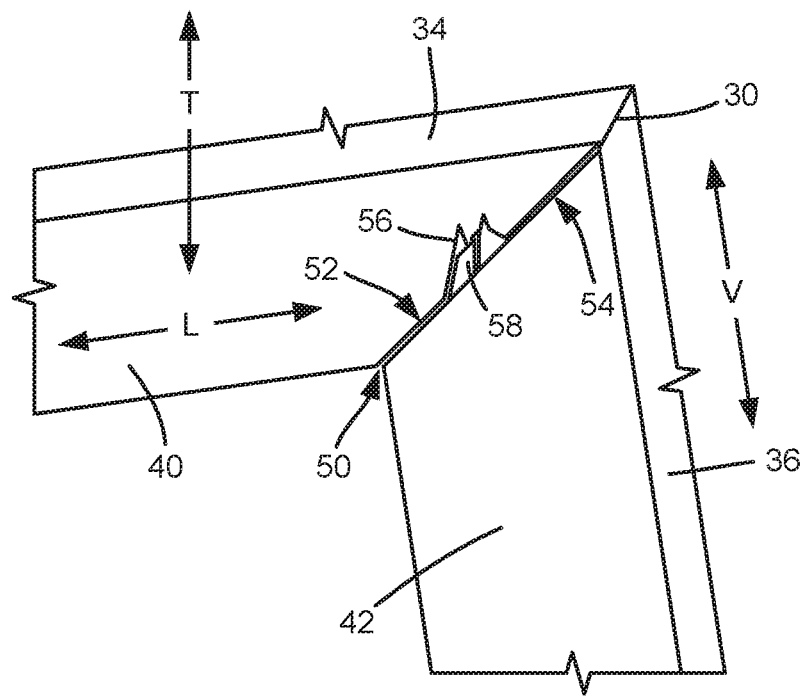
FIGS. 9, 10 and 11 are rear, partial perspective views of a casing according to yet another example embodiment of the present subject matter in various stages of assembly.
Figure 10:
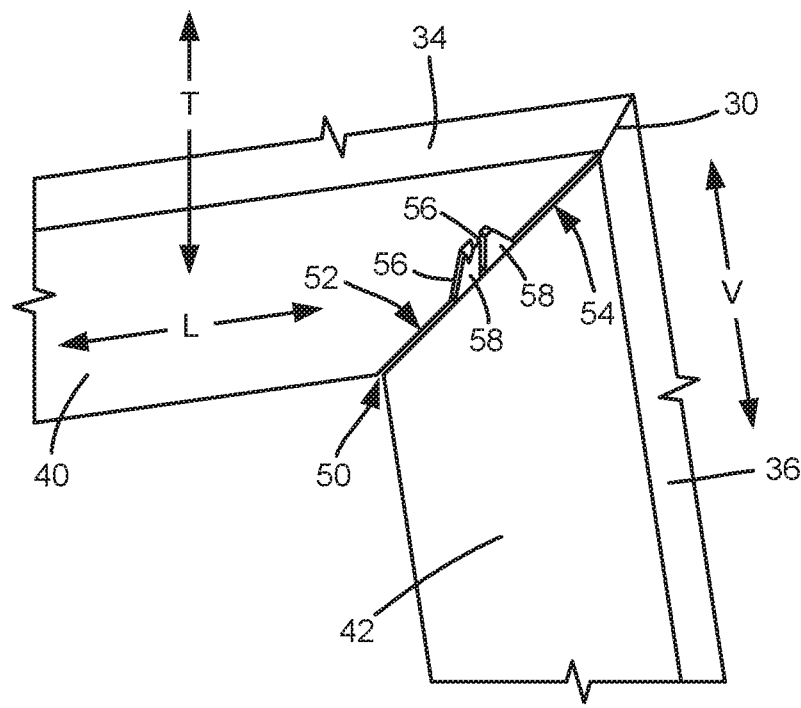
Figure 11:
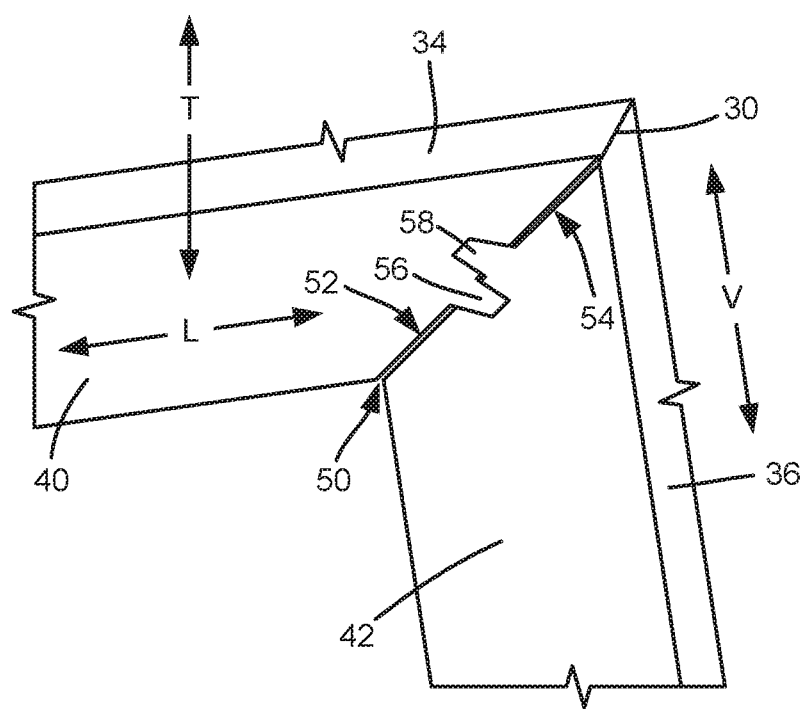

FIGS. 9, 10 and 11 are rear, partial perspective views of outer casing 30 according to another example embodiment of the present subject matter in various stages of assembly. As may be seen in FIGS. 9 through 11, first front flange 40 has tab 56, and second front flange 42 also has tab 58, e.g., as described above. In particular, first front flange 40 may have two (or more) tabs 56, and second front flange 42 may have two (or more) tabs 58. Tabs 56, 58 may be triangularly and/or trapezoidal shaped in certain example embodiments.

Tabs 56, 58 are folded together at mitered joint 50. For example, a top of a first one of tabs 56 may be folded onto the top end of a first one of tabs 58, as shown in FIG. 10. The first one of tabs 56 may also be folded over the first one of tabs 58 until the first tabs 56, 58 are folded flat onto second front flange 42, as shown in FIG. 11. Similarly, a top of a second one of tabs 58 may be folded onto the top end of a second one of tabs 56, as shown in FIG. 10. The second one of tabs 58 may also be folded over the second one of tabs 56 until the second tabs 56, 58 are folded flat onto first front flange 40, as shown in FIG. 11.

By folding tabs 56, 58 together, first and second front flanges 40, 42 are coupled to each other at mitered joint 50. Thus, e.g., edge 52 of first front flange 40 may be fixed relative to edge 54 of second front flange 42 at mitered joint 50, and scraping of paint on the edges 52, 54 may be reduced by coupling first and second front flanges 40, 42 together with tabs 56, 58. In such a manner, costly additional painting of outer casing 30 is reduced, and outer casing 30 may not require welding to form mitered joint 50.

An example method for forming outer casings for refrigerator appliances will now be described. Utilizing such method, mitered joint 50 may be formed without requiring welding and/or costly repainting. It will be understood that while discussed below in a certain sequence, the outer casing formation method may be performed in other suitable sequences in alternative example embodiments. Thus, the outer casing formation method is not limited to the particular sequence described below.

Initially, a single piece of, e.g., pre-painted, sheet metal may be cut and bent/folded to form various components of outer casing 30. For example, the single piece of sheet metal may be cut and bent/folded to form top panel 34 and side panels 36 into an inverted U-shape. Further, first and second front flanges 40, 42 with tabs 56, 58 may also be cut and bent/folded from the single piece of sheet metal. In alternative example embodiments, tabs 56, 58 may be formed separately from first and second front flanges 40, 42.

First front flange 40 and second front flange 42 may then be positioned such that tabs 56 of first front flange 40 are positioned adjacent tabs 58 of second front flange 42. Tabs 56, 58 may extend into outer casing 30, e.g., along the transverse direction T. First front flange 40 is then connected to second front flange 42 at mitered joint 50 by folding the top portion of the first one of tabs 56 onto the top of the first one of tabs 58 and by folding the top portion of the second one of tabs 58 onto the top of the second one of tabs 56, as shown in FIG. 10. Tabs 56, 58 may then be folded flat onto first and second front flanges 40, 42, as shown in FIG. 11. As an example, a die may be positioned over tabs 56, 58 and rotated to fold tabs 56, 58 together in the various stages shown in FIGS. 9 through 11.

Utilizing the above described method, tabs 56, 58 may couple first and second front flanges 40, 42 without requiring glue, welding, elevated temperatures etc., and the sheet metal used to form outer casing 30 may be pre-painted. In addition, the folding of tabs 56, 58 may draw edge 52 of first front flange 40 towards edge 54 of second front flange 42 and thus reduce the gap between first and second front flanges 40, 42 at mitered joint 50.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A refrigerator appliance, comprising:
a cabinet defining a chilled chamber, the cabinet having an outer casing with a first front flange and a second front flange, the first and second front flanges connected at a mitered joint; and
a door mounted to the cabinet, the door sealing the chilled chamber when the door is closed,
wherein each of the first and second front flanges has a pair of tabs extending into the outer casing, the pairs of tabs of the first and second front flanges plastically deformed together at the mitered joint.

2. The refrigerator appliance of claim 1, wherein the outer casing comprises a top panel and a pair of side panels, the first front flange extending downwardly along a vertical direction from the top panel, the second front flange extending inwardly from one of the pair of side panels along a lateral direction, the lateral direction being perpendicular to the vertical direction.

3. The refrigerator appliance of claim 2, wherein the top panel and the pair of side panel are formed from a common piece of sheet metal.

4. The refrigerator appliance of claim 3, wherein the top panel is bent to form the first front flange, and the one of the pair of side panels is bent to form the second front flange.

5. The refrigerator appliance of claim 4, wherein the common piece of sheet metal is a painted piece of sheet metal.

6. The refrigerator appliance of claim 1, wherein the mitered joint is visible when the door is open.

7. The refrigerator appliance of claim 6, wherein the door is positioned over the mitered joint when the door is closed.

8. The refrigerator appliance of claim 1, wherein the tab of the first front flange is undercut at a base of the first front flange.

9. The refrigerator appliance of claim 1, wherein an edge of each of the first and second front flanges is beveled at forty-five degrees at the mitered joint.

10. A method for forming a casing of a refrigerator appliance, comprising:
positioning a first front flange of an outer casing and a second front flange of the outer casing such that a pair of tabs of the first front flange is positioned adjacent a pair of tabs of the second front flange, the pairs of tabs of the first and second front flanges extending into the outer casing; and
connecting the first front flange to the second front flange at a mitered joint by plastically deforming the pairs of tabs of the first and second front flanges together.

11. The method of claim 10, further comprising bending a piece of sheet metal to form a top panel and a pair of side panels of the outer casing.

12. The method of claim 11, wherein the first front flange extends downwardly along a vertical direction from the top panel after bending the piece of sheet metal, the second front flange extends inwardly from one of the pair of side panels along a lateral direction after bending the piece of sheet metal, and the lateral direction is perpendicular to the vertical direction.

13. The method of claim 12, wherein bending the piece of sheet metal further comprises bending the top panel to form the first front flange and bending the one of the pair of side panels to form the second front flange.

14. The method of claim 13, wherein the piece of sheet metal is a painted piece of sheet metal.

15. The method of claim 10, wherein the mitered joint is visible at a front of the outer casing.

16. The method of claim 10, further comprising undercutting the tab of the first front flange at a base of the first front flange.

17. The method of claim 10, wherein an edge of each of the first and second front flanges is beveled at forty-five degrees at the mitered joint.

* * * * *